June 7, 1932.  L. S. SHELDRICK  1,862,099
TRUCK EXTENSION COUPLING SHAFT
Filed Jan. 2, 1931
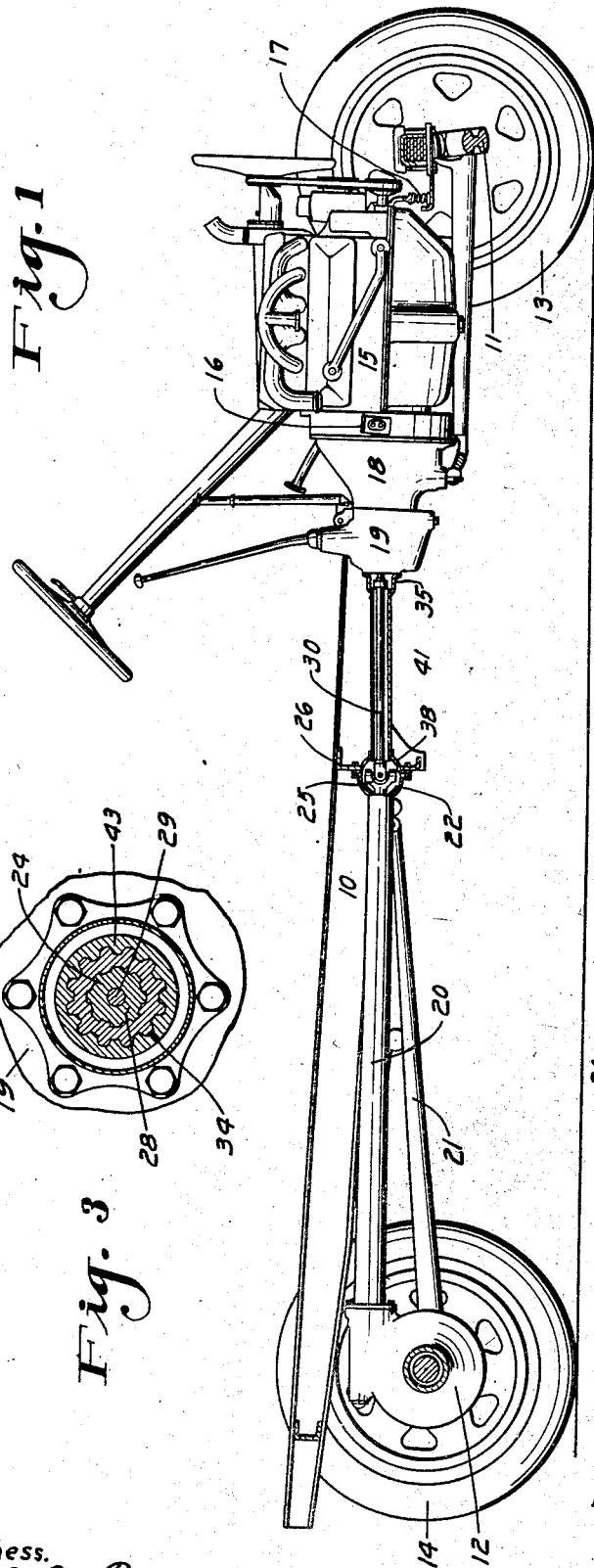
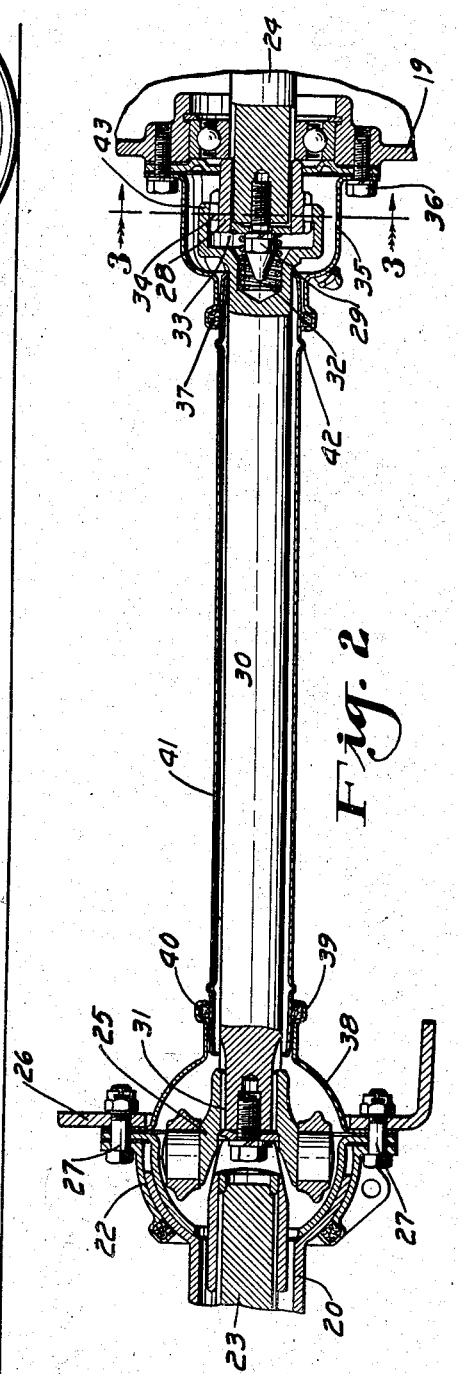
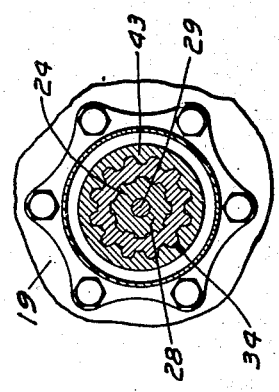
INVENTOR.
L. S. Sheldrick.
BY
E. S. Davis
ATTORNEY.
Witness.
E. C. McRae.

Patented June 7, 1932

1,862,099

UNITED STATES PATENT OFFICE

LAURENCE S. SHELDRICK, OF DEARBORN, MICHIGAN, ASSIGNOR TO FORD MOTOR COMPANY, OF DEARBORN, MICHIGAN, A CORPORATION OF DELAWARE

TRUCK EXTENSION COUPLING SHAFT

Application filed January 2, 1931. Serial No. 506,269.

The object of my invention is to provide an auxiliary drive shaft and housing therefor, which may be conveniently interposed between the forward end of the vehicle torque tube and the engine and transmission unit, thus allowing the wheel base of the truck to be extended the length of the auxiliary drive shaft. By this means the manufacturer can supply, with very little extra cost, several wheel base lengths for each particular truck model to thereby better adapt his product to the needs of the buyers. For example, a truck chassis to be used for passenger bus work must have a relatively long wheel base, while the same chassis when used as a dump truck functions better with a very short wheel base. The particular use to which the truck is to be put controls the desirable wheel base length. Heretofore, when it was desirable to alter the wheel base of a vehicle the manufacturer was required to supply a special torque tube, radius rod and propeller shaft assembly for each particular length chassis desired. Consequently, the cost of adding several feet to the wheel base of the car was prohibitive in many cases where an advantage would otherwise be gained by such an extension.

With my improved device, the torque tube and radius rod assembly is not altered but is used as is for both short and long chassis. A relatively inexpensive extension shaft and housing is provided which may be interposed between the forward end of the torque tube and the rear end of the transmission to thus transmit the drive to the axle.

The advantages just mentioned although lowering production costs for the manufacturer is even more desirable from the standpoint of the purchaser who may now purchase a chassis with the assurance that it may readily and inexpensively be altered to suit his various requirements and that due to such convertibility its value will remain at a high level.

Still a further object of my invention is to provide an extension drive shaft housing for use with a vehicle having the engine resiliently mounted therein. For some time certain manufacturers have resiliently mounted their engines in the chassis frames, the front end of the engine being supported on springs so as to pivot around a transverse center about in line with the engine flywheel. This center is substantially the center of oscillation of the engine and transmission unit mass resulting from the unbalanced secondary inertia forces of the reciprocating parts of the engine being applied in a four cylinder engine, midway between numbers two and three cylinders. Such point of application is well forward from the center of gravity of the unit and may be termed the center of percussion so that the pivotal mounting of the unit if coinciding with the center of oscillation for this center of percussion will not transmit the engine vibration to the frame.

However, the rear end of the engine unit in such case reciprocates arcuately in a vertical path in opposite phase to the forward end so that the drive shaft must have a certain amount of play to compensate for this angular movement. My improved extension drive shaft and housing compensates for this arcuate movement without the relatively expensive universal joint connections which are normally necessary for this purpose.

With these and other objects in view, my invention consists in the arrangement, construction and combination of the various parts of my improved device, as described in the specification, claimed in my claims, and illustrated in the accompanying drawing, in which:

Figure 1 shows a central vertical sectional view through a truck chassis having my improved coupling shaft installed thereon.

Figure 2 shows a sectional view through the coupling shaft and forward end of the torque tube, illustrating in detail my improved device, and Figure 3 shows a cross-sectional view, taken on the line 3—3 of Figure 2.

Referring to the accompanying drawing, I have used the reference numeral 10 to indicate generally a vehicle frame which is supported in the conventional manner on front and rear axles 11 and 12 respectively. Front and rear wheels 13 and 14 are secured to the ends of these axles in the ordinary manner.

An engine 15 is pivotally mounted in the frame 10 on a pair of trunnions 16, one on each side of the engine flywheel housing, and the front end of the engine is resiliently supported by means of compression springs 17 so that the vibrations of the engine are not transmitted to the frame but are absorbed by the vertical oscillation of the engine unit around the trunnions 16. A clutch housing 18 extends rearwardly from the engine and a sliding gear transmission 19 is secured to the rear of this clutch housing from whence the drive is taken to the rear axle 12.

It will consequently be seen that, due to the vibrating oscillation of the engine 15, a small but apparent oscillation of the rear end of the transmission is unavoidable.

The rear axle 12 is provided with a torque tube 20 which extends forwardly therefrom and a pair of diagonal radius rods 21 extend from the outer ends of this axle to the forward end of the torque tube. A universal joint housing 22 is formed integrally with the forward end of this torque tube and a drive shaft 23 is rotatably mounted in the torque tube to transmit the drive to the rear axle from where it is conducted through conventional axle gearing to drive the wheels 14.

When it is desired to provide a short wheel base vehicle, the universal joint housing 22 is bolted directly to the rear of the transmission unit 19. A universal joint 25 is provided in this housing which has one of its members splined to receive the drive shaft 23 while the other member is splined to a shaft 24 which is rotatably mounted in the transmission 19. It will thus be seen that both the rear axle 13 and the engine 15 are allowed to oscillate around the center of the universal joint to compensate for the vertical movement of the rear axle and for the vibrating oscillation of the engine around the trunnions 16.

When it is desirable to increase the wheel base of the vehicle certain difficulties arise, due to the longer torque tube required. First, there is the excessive cost of supplying complete new torque tube, drive shaft and radius rod assembly; and secondly, means must be provided intermediate of the ends of such torque tube for rotatably supporting the center portion of the drive shaft as the normal whip of such a long shaft would be excessive. These two difficulties combine to prohibit the lengthening of the chassis in many instances where it would otherwise be of an advantage.

In the structure herein shown, I have arranged to move the rear axle, torque tube, and radius rod assembly to the rear and to secure by bolts 27, the universal joint housing 22 to one of the frame cross members, which I have designated by numeral 26. Although a space is provided between the rear of the transmission and the forward end of the torque tube it will be noted that the standard drive shaft, universal joint, torque tube and radius rods are still retained.

In my improved construction I universally secure a spacing drive shaft and housing between the transmission and torque tube. It is not possible to fasten this shaft direct to the rear end of the transmission shaft 24 for the reason that the vertical oscillation of this transmission shaft 24 would soon rupture the connection, while if such connection were made strong enough the vibration action of the springs 17 would be destroyed. Means must also be provided for excluding the dirt, water and the like from the universal joint 25 and the transmission, which means must also allow for the movement of the transmission. It is, of course, possible to provide a conventional universal joint at the rear end of the transmission and to provide a pair of ball joint connections at each end of my spacing housing, however, such a structure would be much more expensive than the device herein shown.

In my improved device I secure an annular notched member 28 to the rear of the transmission shaft 24 by means of a cap screw 29, which screw formerly secured the universal joint 25 to the transmission shaft. An extension shaft 30 is provided of a lenght sufficient to extend between the member 28 and the universal joint 25. The forward end of this shaft is enlarged as at 43, which enlarged portion is provided with a recess 33 therein into which the member 28 extends. Internal teeth 34 extend inwardly from the portion 43 and coact with the notches in the member 28. I have provided a helical coil spring 32 between the end of the transmission shaft 24 and the bottom of the recess 33 which spring prevents rattle between the shafts due to any inaccuracies in the parts. Due to the teeth 34 being relatively narrow, a definite angular movement is permitted between the shafts 24 and 30. Although only a small angular movement is so provided still this movement is ample to compensate for the arcuate movement of the engine around the pivot 16 so that a positive universal driving connection is at all times maintained between the shafts 24 and 30.

The rear end of the shaft 30 is splined, as at 31, which splines are identical to the splines in the transmission shaft 24 so that the universal joint 25 may be conveniently secured to this shaft. It will thus be seen that the driving torque is transmitted through the member 28, teeth 34, shaft 30, splines 31 to the universal joint 25 from where it is transmitted in the ordinary manner to the axle 12.

In order to enclose the rotating parts of the device, I have provided a cup-shaped sheet metal housing 35 which is secured over the end of the transmission shaft 24 by a plurality of screws 36 which are ordinarily used to secure the universal joint housing 32 to the rear of the transmission. The housing 35 is provided with an axial sleeve therein through which the shaft 30 extends and in which a felt packing ring 37 is disposed. Likewise, a spherical housing 38 is fastened to the forward face of the universal joint housing 22 and extends forwardly therefrom, this housing also having an integral sleeve 39 extending therefrom through which the shaft 30 projects. A felt ring 40 is provided in the sleeve.

Extending between the felt rings 37 and 40, I have provided a tubular housing 41 which is supported in place around the shaft 30 by means of these felt rings. The ends of this housing project somewhat into the adjacent sleeve members and are slightly tapered or reduced in size to assist in assembling the device. It will be noted that there is considerable clearance between the shaft 30 and the housing 41 and also clearance between this housing and the sleeves into which it extends, whereby a limited angular movement is permitted between these members without binding. A pair of annular ribs 42 are formed around the housing 41 adjacent to each of the felt rings to thereby prevent excessive longitudinal movement of this housing.

There being considerable flexibility in the felt rings 37 and 40, the arcuate vibrating movement of the transmission 19 is well within the range of movement allowed thereby. Thus, a simple and inexpensive structure is provided consisting substantially of only three inexpensive pressed steel parts to thereby totally enclose the extension drive shaft and universal joint.

Among the many advantages arising from the use of my improved device it may be well to mention that a simple, durable and inexpensive extension shaft is provided whereby the wheel base of the truck may be conveniently lengthened without the expense of a new rear axle and torque tube assembly. Still further, my improved extension shaft and housing compensates for the angular oscillating movement of the transmission in those vehicles wherein the engine is resiliently mounted. Such movement is accomplished without the use of a second universal joint or ball joint housing members.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a device for coupling the forward end of a vehicle drive shaft to the rear end of an engine unit, a coupling shaft universally connected to both said drive shaft and engine thereby transmitting the engine torque to the drive shaft, a pair of resilient housing supporting members one secured to said vehicle frame and the other to said engine unit, and a tubular housing enclosing said coupling shaft supported entirely by said resilient members whereby water, dirt and the like are excluded from said shaft and universal connections and whereby a limited universal movement is permitted between said vehicle and said housing.

2. In a device for coupling the forward end of a vehicle drive shaft to the rear end of an engine unit, means for pivotally mounting the forward end of said drive shaft on the vehicle frame, a coupling shaft universally connected to both said drive shaft and engine whereby the engine torque is transmitted to the drive shaft, a pair of resilient housing supporting members one secured to said vehicle frame so as to complete the enclosure for said pivotal mounting and the other secured to said engine unit, and a tubular housing enclosing said coupling shaft supported entirely on said resilient members whereby said universal connections are protected and whereby a limited universal movement is permitted between said housing and vehicle.

3. In a device for coupling the forward end of a vehicle drive shaft to the rear of an engine unit, means for pivotally mounting the forward end of said drive shaft on the vehicle frame, a coupling shaft universally connected to both said drive shaft and engine whereby the engine torque is transmitted to the drive shaft, a pair of spaced felt rings one supported on said vehicle frame adjacent to the pivotal mounting and the other secured on said engine unit, and a tubular housing enclosing said coupling shaft and extending substantially the length thereof so as to be supported on said felt rings whereby an enclosure is provided for said coupling shaft and universal connections, which enclosure is permitted a limited universal movement relative to said frame and engine.

4. In a deivce for coupling the forward end of a vehicle drive shaft to the rear end of an engine unit, a torque tube rotatably supporting the forward end of said drive shaft, said torque tube being pivotally connected to the vhicle frame, a coupling shaft connected to and extending rearwardly from said engine unit, said coupling shaft being connected to said drive shaft by a universal joint, a bell-shaped housing enclosing the forward portion of said universal joint and having an annular felt ring secured therein around said coupling shaft, and a tubular housing extending rearwardly from said engine around said coupling shaft supported entirely by said felt ring and engine connection to thereby enclose said coupling shaft and universal joint and be permitted a limited universal movement relative to said frame.

5. In a device of the character described, a vehicle frame having an engine and transmission unit pivotally mounted therein so that the rear end of said unit oscillates in a vertical path, a torque tube universally connected to a vehicle frame member, a drive shaft rotatably mounted in said torque tube, a coupling shaft universally connecting the rear end of said transmission with the forward end of said torque tube, a pair of bell-shaped housings one extending rearwardly from said transmission unit and the other extending forwardly from said frame member adjacent to the universal connection of said torque tube, a felt ring secured in each of said bell-shaped housings, and a tubular housing supported entirely by said felt rings extending between said housings around said coupling shaft to thereby form a flexible enclosure for said coupling shaft and universal connections.

6. In a device of the character described, a vehicle frame having an engine and transmission unit pivotally mounted therein for vertical oscillation, a torque tube universally connected to the vehicle frame, in position spaced rearwardly from said transmission, a pair of bell-shaped housings one extending rearwardly from said transmission unit and the other extending forwardly from said frame adjacent to the forward end of said torque tube, a felt ring secured in each of said housings, a tubular housing supported entirely by said felt rings extending between said housings to thereby form a flexible enclosure therebetween, and a coupling shaft disposed in said tubular housing universally connecting said transmission and torque tube to thereby transmit the engine torque to the torque tube irrespective of the oscillation of said engine.

7. In a device of the character described, a vehicle frame having an engine and transmission unit resiliently mounted therein for vertical oscillation, a torque tube spaced rearwardly from said transmission unit, the forward end of said torque tube being universally secured to a frame member, a pair of aligned bell-shaped housings secured to said transmission unit and said frame member, respectively, said housings each having an annular flexible ring therein, a tubular housing extending between aid rings and supported thereon so as to form a flexible enclosure between said housings, a pair of annular ribs extending outwardly from said tubular housing one adjacent to each of said rings whereby axial movement of said housing is limited, and flexible driving means extending from said engine through said housings whereby the engine torque is transmitted to drive said vehicle.

LAURENCE S. SHELDRICK.